Feb. 15, 1927. 1,617,836
W. F. DAUGHERTY
RAIL BOND
Filed June 4, 1926   2 Sheets-Sheet 1
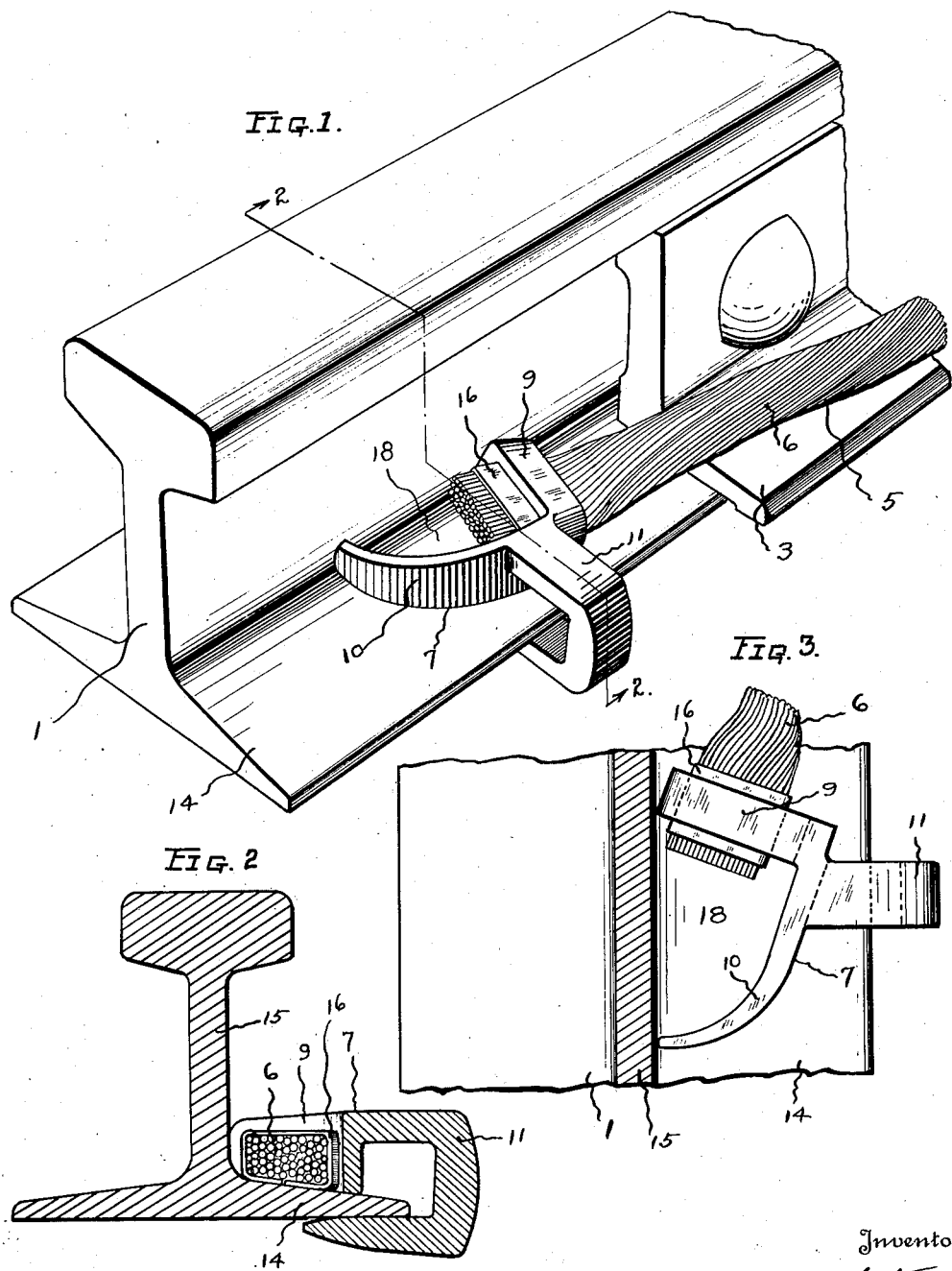

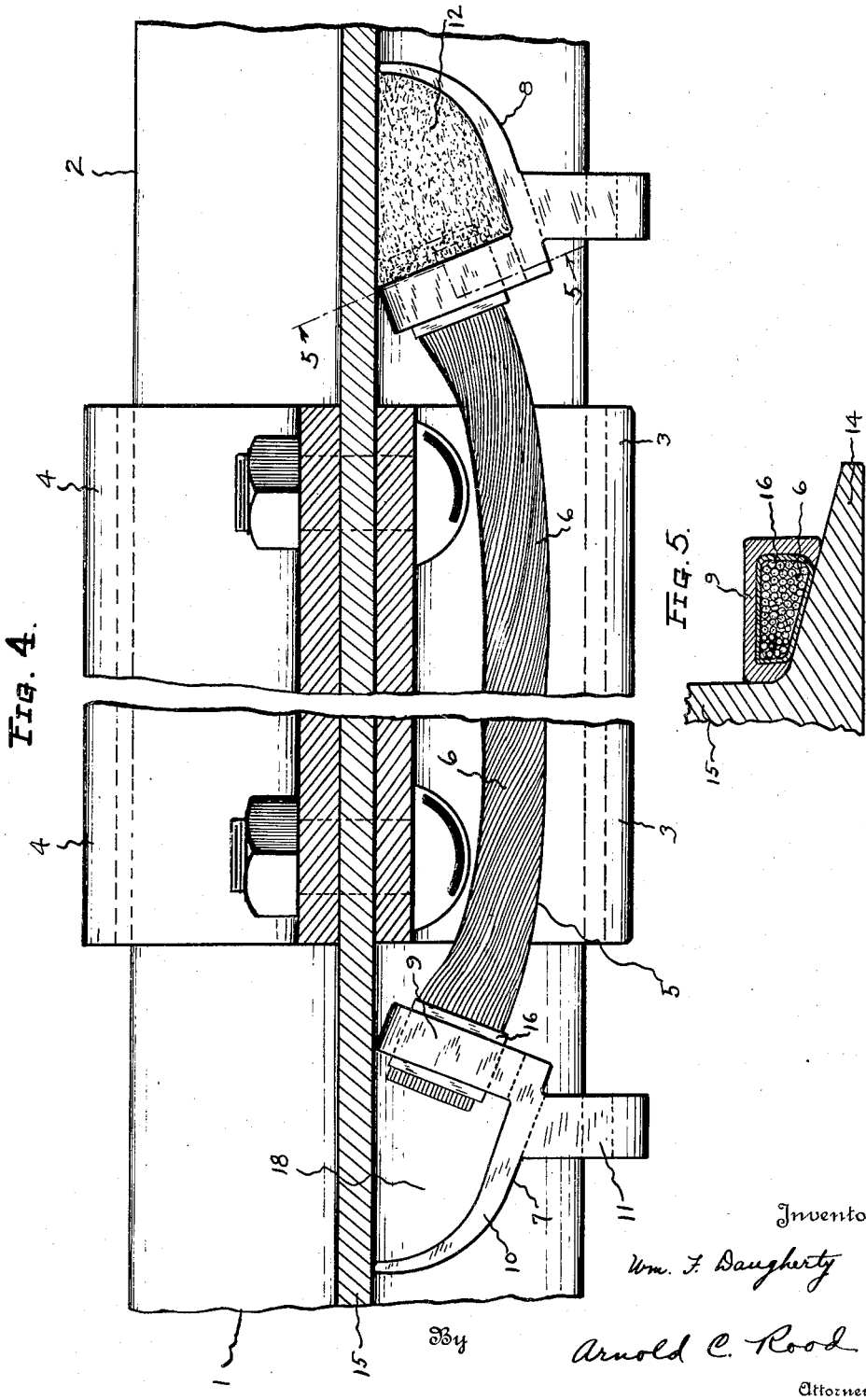

Patented Feb. 15, 1927.

1,617,836

UNITED STATES PATENT OFFICE.

WILLIAM F. DAUGHERTY, OF CLEVELAND, OHIO.

RAIL BOND.

Application filed June 4, 1926. Serial No. 113,625.

This invention relates to rail bonds, and more particularly to rail bonds adapted to be welded to the base of a rail.

In the bonding art, it is frequently desired to weld a rail bond to the base of a rail, or to the base and web thereof, and to provide a molten metal retaining portion for weld metal to be united to the bond cable and to the rail. In the past, it has been found difficult to maintain such molten metal retaining portions in welding position on the base of a rail. This has been particularly true where bonds having a relatively long length of cable have been employed.

An object of this invention is to provide a rail bond which may be readily disposed on the base of a rail and readily maintained in desired position during the welding operation.

Another object of my invention is to provide for a rail bond, a mold portion provided with an extension to secure said mold portion and the adjacent cable to the rail base.

A further object of the invention is to provide a rail bond which may be readily seated on a rail base and maintained in welding position, whereby the cable of said bond may be welded to the base and web of the rail.

Another object of my invention is to provide a rail bond requiring a minimum amount of weld metal to form an advantageous and secure weld to the bond cable.

Other objects of the invention will be apparent to those skilled in the art from the description of it hereinafter given.

In the drawings:

Figure 1 is a perspective view showing one end of a bond cable and a mold portion according to my invention disposed in cooperative relation to said bond cable.

Fig. 2 is a vertical section on the line 2—2 of Fig. 1.

Fig. 3 is a plan view of the bond shown in Fig. 1.

Fig. 4 is a fragmentary plan view partly in section, showing a bond contemplated by my invention, weld metal being shown disposed in one of the mold cavities; and Fig. 5 is a vertical section on line 5—5 of Fig. 4.

I have illustrated a rail joint formed by the rails 1 and 2 and the fish plates 3 and 4 of a common and well known type. To electrically unite the rails 1 and 2 I have shown an improved rail bond of my invention designated generally at 5. The bond 5 is shown as comprising a flexible cable 6 which may be of copper or other suitable material, and the mold portions 7 and 8. The mold portion 7 is shown as comprising a cable engaging or clamping section 9, an upright wall 10 arranged to extend along said rail base, and an extension 11 formed to extend preferably in spaced relation to the upper side of the rail base over the edge of said rail base and along the underside thereof for the purpose of maintaining the mold portion 7 in desired poistion on the rail base during the welding operation whereby weld metal may be received in the mold cavity 18, such weld metal being shown at 12 in Fig. 4.

The mold portion 7 is preferably integral that is all metal and may be readily formed from cast metal such as cast or malleable iron, although it will be understood that any suitable material may be employed therefor.

Where it is desired to weld the cable 6 to the base and web of the rail, the upright wall 10 may extend to the web 15 of the rail. In such case, the cable engaging section 9 or an extension thereof, also preferably engages with the web 15.

The portion of the cable 6 engaged by the section 9 is shown as surrounded by a metal sleeve 16 which is preferably of copper, but may be of any suitable material such as soft steel or non-ferrous metal. The sleeve 16 serves to keep the individual strands of the cable 6 together and to prevent any damage to said strands by the section 9. The cable engaging section 9 may be attached to the cable 6 before the welding operation in any suitable manner as by a pressing operation.

Referring particularly to Fig. 5, it will be seen that the section 9 engages the sleeve 16 on the sides and top thereof, the lower portion of the sleeve 16 engaging directly with the upper surface of the rail base 14. In this manner, the sleeve 16 and the cable 6 are disposed relatively close or directly adjacent to the rail base 14 whereby molten weld metal within the mold cavity 18 adjacent the cable 6 may be chilled and such leakage from the mold cavity prevented. Moreover a minimum amount of weld metal is thus required to unite with said cable (6) throughout its entire cross-section. It will also be noted by reference to Fig. 5 that the cable engaging section 9 engages the rail base relatively closely and where it is desired to weld to the web 15, engages said web relatively closely. In this manner, molten weld metal may be effectively retained within the mold cavity 18. The end of the cable 6 preferably extends into the mold cavity 18 whereby the ends of the strands forming said cable may be readily melted and integrally united to the rail.

Referring to Fig. 2, the extension 11 extends outwardly from the upright wall 10, the portion of the extension adjacent to said upright wall being spaced from the rail base. I prefer this construction for the reason that after the welding operation is completed, such extension 11 may be readily severed from the remainder of the mold portion 7 by striking the upper portion of such extension 11 with a hammer. It will be understood however, that if desired, the extension 11 may be attached to the remainder of the mold portion 7 at any suitable point.

The said mold portion may be readily disposed in welding position on the rail base as by striking the vertical portion of the extension 11 with a hammer. Weld metal melted by the electric arc, gas flame, or other suitable method may then be disposed in the mold cavity 18 and be integrally united to the rail base and rail web and to the cable 6. The weld metal 12 need not necessarily be integrally united to the upright wall 10 of the mold portion 7. After the welding operation is completed, the mold portion 7 may be left in position, or the extension 11 alone or together with a portion of the upright wall 10 may be removed as by striking said extension with a hammer.

It will be seen that the mold portion 7 and the cable 6 together form an open-top, open-bottom, open-side molten metal retaining portion, said molten metal retaining portion being adapted to form with said rail base and web an open-top molten metal receiving mold cavity.

It will be understood, of course, that the mold portion 7 may be disposed remote from the web 15 as well as adjacent thereto, the open side of the mold cavity in such case being closed by any suitable means.

The mold portion 8 is shown as of the same construction as portion 7, the parts of portion 8 being arranged to cooperate with the opposite end of cable 6.

It will thus be seen that I have provided a rail bond which may be readily positioned on the rail base and maintained in desired welding position.

It will further be noted that I have provided a mold portion whereby a bond cable may be readily and advantageously integrally united to the base and web of the rail.

Since the cable (6) and sleeve (16) are disposed directly adjacent to or substantially in contact with the upper side of the rail base (14) it will be noted that a minimum amount of weld metal is required to unite with said cable (6) throughout its entire cross-section.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In a rail bond adapted to be seated on a rail base and to be welded thereto, in combination, a metal mold portion and a flexible bond cable, said mold portion comprising an inverted substantially U-shaped cable engaging section engaging said cable whereby the portion of said cable directly beneath said cable engaging section may be disposed directly adjacent the top surface of said rail base, an upright wall arranged to extend along said rail base, and an extension formed to extend over the edge of said rail base and along the under side thereof to hold said mold portion in desired position during the welding operation, said mold portion and flexible cable forming an open-top, open-bottom, open-side molten metal retaining portion adapted to form with the rail base and web an open top molten metal receiving mold cavity, the end of said cable extending into said mold cavity.

2. In a rail bond adapted to be seated on a rail base and to be welded thereto, in combination, a metal mold portion and a flexible bond cable, a metal sleeve substantially surrounding said bond cable adjacent an end thereof, said mold portion comprising an inverted substantially U-shaped cable engaging section engaging said sleeve whereby said sleeve may be disposed directly adjacent the top surface of said rail base, an upright wall arranged to extend along said rail base, and an extension formed to extend over the edge of said rail base and along the under side thereof to hold said mold portion in desired position during the welding operation, said mold portion and flexible cable forming an open-top, open-bottom, open-side molten metal retaining portion adapted to form with the rail base and web an open top molten metal receiving mold cavity, the end of said cable extending into said mold cavity.

3. In a rail bond adapted to be seated on a rail base and to be welded thereto, in combination, a metal mold portion and a flexible bond cable, said mold portion comprising a cable engaging section engaging said cable, an upright wall arranged to extend along said rail base, and an extension spaced from said rail base and formed to extend over the edge of said rail base and along the under side thereof to hold said mold portion in desired position during the welding operation, said mold portion and flexible cable forming an open-top, open-bottom, open-side molten metal retaining portion, adapted to form with the rail base and web an open top molten metal receiving mold cavity, the end of said cable extending into said mold cavity.

4. In a rail bond adapted to be seated on a rail base and to be welded thereto, in combination, a mold portion and a flexible bond cable, said mold portion comprising a cable engaging section engaging said cable, an upright wall arranged to extend along said rail base, and an extension spaced from said rail base and formed to extend over the edge of said rail base and along the under side thereof to hold said mold portion in desired position during the welding operation, said mold portion and flexible cable forming an open-top, open-bottom, molten metal retaining portion adapted to form with said rail base an open top molten metal receiving mold cavity, the end of said cable extending into said mold cavity, said spaced extension being adapted to be readily severed from said upright wall when the welding operation is completed.

In testimony whereof I affix my signature.

WILLIAM F. DAUGHERTY.